United States Patent [19]

Maehara

[11] 4,199,197
[45] Apr. 22, 1980

[54] DECELERATION DETECTING TYPE PROPORTIONING VALVE FOR VEHICLE

[75] Inventor: Toshihumi Maehara, Chichibu, Japan

[73] Assignee: Akebono Brake Industry Co. Ltd., Tokyo, Japan

[21] Appl. No.: 923,565

[22] Filed: Jul. 11, 1978

[30] Foreign Application Priority Data

Jul. 19, 1977 [JP] Japan .............................. 52-96104[U]

[51] Int. Cl.² ............................................. B60T 8/14
[52] U.S. Cl. .................................. 303/24 F; 303/6 C
[58] Field of Search ............. 188/349; 303/6 C, 24 A, 303/24 B, 24 C, 24 F

[56] References Cited

U.S. PATENT DOCUMENTS

| | | | |
|---|---|---|---|
| 3,385,308 | 5/1968 | Farr | 303/24 C X |
| 4,116,493 | 9/1978 | Hayashida | 303/24 F X |

*Primary Examiner*—Duane A. Reger

*Attorney, Agent, or Firm*—Toren, McGeady and Stanger

[57] ABSTRACT

A deceleration detecting type proportioning valve for a vehicle arranged in combination with a deceleration detecting valve. Under a no load or light load condition of the vehicle, when deceleration caused by a braking operation reaches a preset value, a deceleration detecting valve is closed. Following this, the proportioning valve which is by-pass connected to the deceleration detecting valve performs proportioning control to provide a controlled hydraulic brake pressure for each rear wheel cylinder to prevent locking of rear wheels. Under a maximum or heavy load condition, even when the deceleration detecting valve closes, the proportioning valve serves to open the hydraulic brake pressure passage to ensure communication between a master cylinder and the rear wheel cylinder to effect increase in hydraulic brake pressure for the latter to the same degree as front wheel cylinders so that insufficiency in the braking force on the rear wheels can be prevented.

9 Claims, 4 Drawing Figures

DECELERATION DETECTING TYPE PROPORTIONING VALVE FOR VEHICLE

BACKGROUND OF THE INVENTION

1. Field of the Invention

This invention relates to a proportioning valve of a deceleration detecting type for a vehicle and more particularly to a proportioning valve which satisfactorily controls a braking force on rear wheels during a braking operation by detecting variation in the live load on the vehicle.

2. Description of the Prior Art

For braking a vehicle, it is often necessary to make the braking force on the rear wheels smaller than that on the front wheels. To meet this requirement, heretofore, a proportioning valve or a limiter valve has been inserted in a hydraulic brake passage from a master cylinder to each rear wheel cylinder.

Such a conventional control method, however, is hardly capable of covering the whole range of variation in the live load on a vehicle, particularly when the vehicle is a truck on which the live load varies to a great extent. Such incapability has caused an insufficient rear wheel braking force under a maximum live load condition and thus resulted in an increased braking distance. The present invention is directed to the solution of the problem of the conventional method.

SUMMARY OF THE INVENTION

It is therefore a general object of this invention to provide a proportioning valve which is arranged in combination with a deceleration detecting valve in such a manner that: Under a no live load or a light live load condition, when deceleration caused by a braking operation on a vehicle reaches a preset value, a deceleration detecting valve is closed; following this, the proportioning valve, which is by-pass connected to the deceleration detecting valve, performs proportioning control to obtain a controlled hydraulic brake pressure for each rear wheel cylinder; and, under a maximum live load condition or a heavy load condition, even when the deceleration detecting valve closes, the proportioning valve which is by-pass connected thereto serves to open the hydraulic brake pressure passage to ensure communication between a master cylinder and the rear wheel cylinder.

The above and further object, features and advantages of the present invention will become apparent from the following description of preferred embodiments thereof taken in connection with the accompanying drawings.

BRIEF DESCRIPTION OF THE DRAWINGS

All of the accompanying drawings illustrate embodiments of this invention.

DETAILED DESCRIPTION OF PREFERRED EMBODIMENTS

Figure 1:
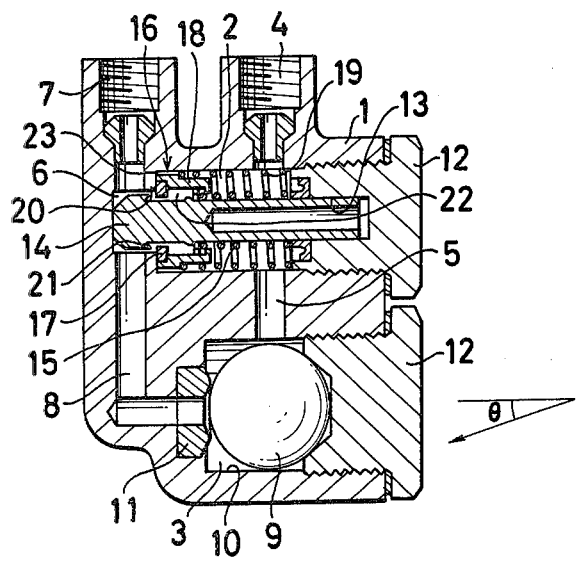
FIG. 1 is a longitudinal sectional view showing a deceleration detecting type proportioning valve as a first embodiment of this invention.
Figure 2:
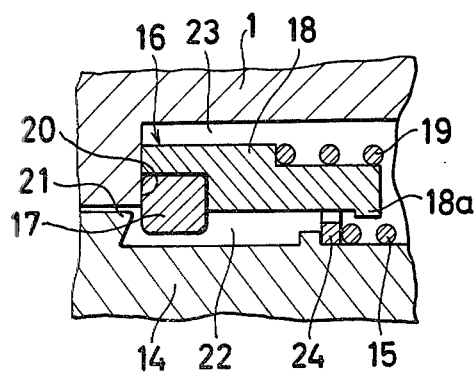
FIG. 2 is a sectional view showing a part of the proportioning valve.

In FIG. 1 and FIG. 2, a reference numeral 1 indicates a cylinder body; 2 indicates an input chamber of the proportioning valve; 3 indicates an input chamber of a deceleration detecting valve; 4 indicates an input port which connects a master cylinder (not shown) to the input chamber 2; 5 indicates a flow passage connecting the input chambers 2 and 3; 6 indicates an output chamber; 7 indicates an output port connected to a rear wheel cylinder (not shown); and 8 indicates a flow passage.

The deceleration detecting valve is of the same structural arrangement as those of conventionally known deceleration detecting valves. A ball valve 9 disposed within the input chamber 3 is guided by a guide face 10 provided at an angle of elevation $\theta$ to the forward moving direction of the vehicle indicated by an arrow and is caused to make an inertial movement to engage a valve seat 11 by a preset deceleration value g during a braking operation on the vehicle.

In this manner, the ball valve 9 of the deceleration detecting valve comes to engage the valve seat 11 to shut off communication between flow passages 5 and 8. This is unrelated to the value of hydraulic brake pressure and is only dependent on whether or not the deceleration exceeds the above stated preset value g during a braking operation.

A differential area piston 14 one end of which is slidably inserted in the cylinder part 13 of a plug 12 is arranged to be movable within the input chamber 2 in the axial direction while the left end of the piston 14 adjoins the output chamber 6 provided for a rear wheel cylinder. The piston 14 is provided with a first spring 15 which resiliently urges the piston 14 toward the output chamber 6. A valve member 16 which comprises an elastic seal 17 and a seal holder 18 carrying the seal 17 is caused by a resilient force of a second spring 19 to engage through the seal 17 a fixed valve seat 20 formed within the input chamber 2 of the cylinder body 1. The seal 17 engages a valve head 21 defined on the piston 14. This shuts off communication between the input chamber 2 and the output chamber 6 through a flow passage 22. The seal holder 18 which is of a cylindrical shape is provided with an annular protrusion 18a (FIG. 2); and the rightward moving force of the piston 14 is transmitted through a washer 24 to this protrusion 18a to move the seal 17 away from the valve seat 20.

The inner circumferential face of the input chamber 2, the valve member 16 and the piston 14 define flow passages 22 and 23 which allow the input 2 and the output chamber 6 to communicate with each other. The flow passage 22 is defined between the valve member 16 and the outer circumferential face of the piston 14 and is opened and closed by cooperation between the valve head 21 and the seal 17 of the valve member 16. Another flow passage 23 is defined between the valve member 16 and the inner circumferential face of the cylinder body 1 and is opened and closed by cooperation between the fixed valve seat 20 and the seal 17.

In the proportioning valve which is constructed as described in the foregoing, the pressure receiving area of the piston 14 which receives an axial hydraulic force acting on the piston 14 in the direction of the input chamber 2 (to the right as viewed on the drawing) is larger than the pressure receiving area thereof which receives a hydraulic force acting on the piston 14 in the direction of the output chamber 6 (to the left as viewed on the drawing). Therefore, when input hydraulic pressure attains a preset value P1, the piston 14 moves to the right against the spring force of the first spring 15 and the valve head 21 comes to engage the seal 17 of the valve member 16 to shut off the flow passage 22.

The proportioning valve operates in the following manner: With the vehicle in an empty condition, when hydraulic brake pressure develops at the master cylinder, the hydraulic pressure is transmitted to each rear wheel cylinder through the input port 4, the input chamber 2, the flow passage 5, the input chamber 3, the flow passage 8, the output chamber 6 and the output port 7.

The hydraulic pressure within the input chamber 2 is transmitted also to the output chamber 6 through the flow passage 22 of the proportioning valve, because the piston 14 is biased by the force of the first spring 15 and thus the valve head 21 is away from the seal 17 of the valve member.

Under this condition, assuming that the value of hydraulic pressure when the hydraulic brake pressure has increased causing the deceleration of the vehicle to reach the preset value g is $P_0$, the ball valve 9 of the deceleration detecting valve shuts off the flow of the hydraulic brake oil by coming into contact with the valve seat 11 when the hydraulic pressure becomes $P_0$. When the hydraulic pressure further increases to reach a hydraulic pressure value P1, the valve head 21 of the piston 14 comes into contact with the seal 17 of the valve member 16 to close the flow passage 22. The hydraulic pressure P1 is determined by the force F1 of the first spring 15 and the sectional area of the portion of the piston 14 at which the piston 14 is in sliding contact with the cylinder 13. When the hydraulic pressure still further increases, a leftward hydraulic force is applied to the piston 14 and the valve head 21 moves away from the seal 17 to increase the pressure of the output chamber 6. Then, the increased hydraulic pressure of the output chamber 6 causes the valve head 21 to come again into contact with the seal 17. Since the pressure receiving areas on the left and right sides of the piston 14 are different from each other, the hydraulic pressure increasing rate of the output chamber 6 is lower than that of the input chamber 2.

Under a maximum load condition, in order to attain the preset deceleration value g of the vehicle, the hydraulic pressure to be transmitted from the master cylinder to each of the rear wheel cylinders must be sufficiently larger than the hydraulic pressure to be transmitted under an empty condition of the vehicle.

Let us assume that the value of hydraulic pressure required in this case for attaining the preset deceleration value g is P3 ($P_3 > P_0$). The flow passage 22 of the proportioning valve is closed at the hydraulic pressure P1, because then the valve head of the piston 14 is in contact with the seal 17 of the valve member 16. On the other hand, since the preset deceleration value g has not yet been attained, the deceleration detecting valve still allows passage through the flow passages 5 and 8 which by-pass the above stated flow passage 22.

Under this condition, when the force of the second spring 19 which is pushing the valve member 16 is sufficiently large, the hydraulic force of the output chamber 6 which is acting on the piston 14 is unable to move the valve member 16 away from the fixed valve seat 20 and the piston remains stationary in its position. As mentioned in the foregoing, under a maximum load condition, the braking force on the rear wheels becomes insufficient and, therefore, the communication between the master cylinder and the rear wheel cylinder must be secured without performing proportional control through the proportioning valve.

Accordingly, the setting value F2 of the force of the second spring 19 is determined such that the flow passage 23 which is provided on the outer circumference of the seal holder 18 is open when the hydraulic pressure is at the value P3 or a little lower than that.

In other words, the force of the second spring 19 is set to ensure that, at the hydraulic pressure value P3, the force acting on the piston 14 in the right direction, as viewed on the drawing, overcomes the forces of the first and second springs 15 and 19 to move the valve member 16 away from the fixed valve seat 20. If the hydraulic pressure at the time when the valve member 16 departs from the valve seat 20 is P4 ($<P_3$), and if the cross-sectional dimension of the cylinder 13 is Ao, the relation of $P_4 Ao > F_1 + F_2$ exists. Thereafter the ball valve 9 comes into contact with the valve seat 11. After that, the hydraulic pressure of the rear wheel cylinder increases in the same manner as the master cylinder, because the flow passage 23 allows the input chamber 2 to communicate with the output chamber 6.

Under a half load (light load) condition, the vehicle deceleration degree reaches the predetermined value g at the hydraulic pressure value P2 ($P_3 > P_2 > P_0$) with the flow passage 23 not opened in the same manner as in the case of the maximum load condition. Then, the deceleration detecting valve is closed and both the flow passages 22 and 23 of the proportioning valve are also closed. This condition continues until the hydraulic pressure of the master cylinder is sufficiently increased. Following this, the hydraulic pressure of the rear wheel cylinder increases in a manner identical with the hydraulic pressure increasing characteristic that takes place in the case of an empty condition of the vehicle.

Figure 3:
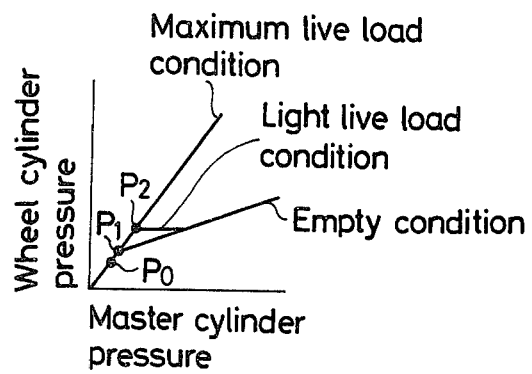
FIG. 3 illustrates the hydraulic pressure characteristic of the embodiment.

FIG. 3 shows the above stated relation in the hydraulic pressure characteristic.

Figure 4:
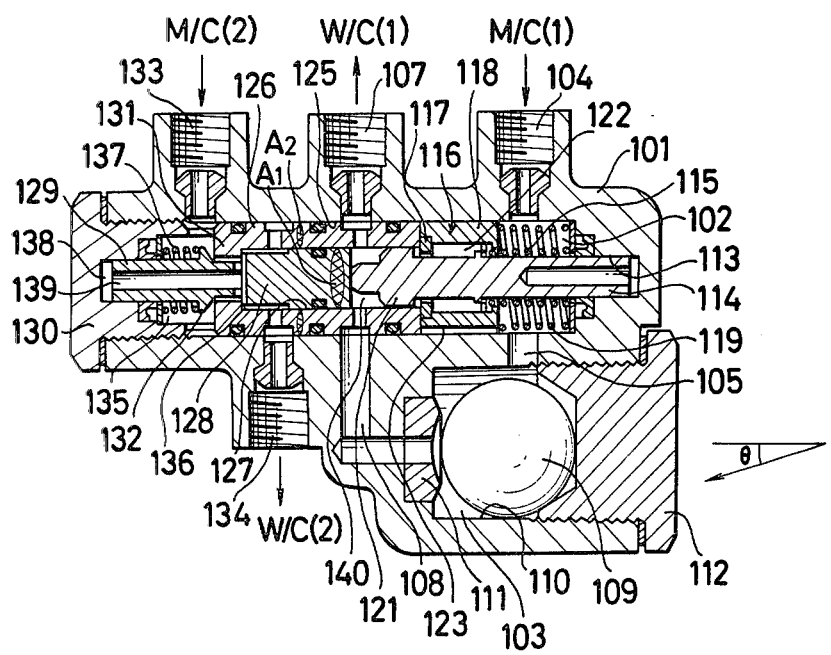
FIG. 4 is a longitudinal sectional view showing another deceleration detecting type proportioning valve as a second embodiment of the invention.

FIG. 4 shows a second embodiment in which the deceleration detecting type proportioning valve of the present invention is applied to a hydraulic control circuit of a double piping type. In FIG. 4, like parts are indicated with like reference numerals with 100 added to those used in the example of the first embodiment example. The proportioning valve and the deceleration detecting valve employed in the hydraulic control part of a first channel are of a structural arrangement similar to the arrangement described in the foregoing. In this embodiment, however, another channel (or a second channel) is provided with the structural arrangement for hydraulic control indicated in the description which follows.

An input chamber 102 is connected through an input port 104 to the first channel M/C(1) of a master cylinder while an output chamber 140 is connected through an output port 107 to a wheel cylinder W/C(1) of the first channel. A cylinder member 126 is in slidable engagement with a large diameter cylinder 125 of a cylinder body 125. A balance piston 128 is arranged to slidably engage a cylinder 127 which is bored through the axial portion of the cylinder member 126. The tip portion of a differential area piston 114 of the proportioning valve of the first channel is in contact with one end of the balance piston 128 while a poppet valve 129 which controls communication of the second channel M/C(2) of the master cylinder with a rear wheel cylinder W/C(2) is in contact with the other end of the balance piston 128. The poppet valve 129 is carried by a plug 130 fixed to a cylinder body 101 and is movable in the axial direction. A valve seat 131 defined by the cylinder member 126 and a valve body 132 formed at the poppet valve 129 cooperate with each other to open and close a port 133 connected to the second channel M/C(2) of the master cylinder and an input chamber 135 and an output chamber 136 communicating with a port 134 which is connected to the rear wheel cylinder W/C(2) provided in the second channel separately from the first channel described in the foregoing.

A third spring 137 pushes the poppet valve 129 toward the valve seat 131. The left end part of the poppet valve 129 is disposed to adjoin an oil chamber 138 which communicates through a flow passage 139 with an output chamber 136 communicating with the rear wheel cylinder W/C(2).

The structural arrangement being as described in the foregoing, a force acting on the poppet valve 129 in the axial direction and in the rightward direction, as viewed on the drawing, is a sum of the resilient force of a third spring 137 and, with hydraulic pressure being in action, a hydraulic force within the oil chamber 138. Another force acting on the poppet valve 129 in the leftward direction, as viewed on the drawing, is a sum of the resilient force of the first spring 115 transmitted through sliding area of the piston 114 within a small diameter cylinder 113 and a hydraulic force within a flow passage 135.

In its stationary condition, the poppet valve 129 engages the balance piston 128 and the latter is in engagement with the piston 114. When the setting value F2 of the force of the third spring 137 is set to be smaller than the setting value F1' of the force of the first spring 115 (F3<F1'), the valve body part 132 of the poppet valve 129 of the second channel is away from the valve seat 131 of the cylinder member 126. Then, when the hydraulic brake pressure reaches a preset value, the piston 114 moves to the right as viewed on the drawing and the force of the third spring 137 causes the poppet valve 129 to move to the right to bring the valve body part 132 into contact with the valve seat 131. When a hydraulic brake pressure develops, the hydraulic pressure increasing characteristics of the rear wheel cylinders in the first and second channels are as indicated hereinafter.

Under an empty condition of the vehicle, the deceleration detecting valve closes at the hydraulic pressure value $P_0$ as mentioned in the foregoing. When the hydraulic force acting on the piston 114 comes to surpass the pushing force of the spring 115, the piston 114 moves to the right. The valve head 121 comes into contact with the seal 117 of the valve member 116 to close the flow passage 122. Concurrently with this, the pushing force of the spring 137 moves the poppet valve 129 to bring the valve body 132 onto the valve seat 131 to shut off the communication between the input chamber 135 and the output chamber 136. Further, the pressure receiving areas of the poppet valve 129 on its left and right sides are equal and thus the hydraulic forces in the axial directions of the poppet valve 129 are balanced.

Following this, when the hydraulic brake pressure of the master cylinder further increases, opening and closing of the flow passage 122 are repeated, while the hydraulic pressure of the rear wheel cylinder in the first channel is reduced at a preset rate relative to the input pressure in the same manner as in the case of the first embodiment example. Then, in the second channel, the valve body 132 of the poppet valve 129 is in contact with the valve seat 131 to shut off the flow passage. When there arises a difference between the hydraulic pressure across the balance piston 128, the balance piston 128 moves to the left as viewed on the drawing in accordance with increases in the output hydraulic pressure of the first channel and thus comes to push the poppet valve 129. This causes the valve body 132 to move away from the valve seat 131. As a result of this, the input port 133 comes to communicate with the output port 134 and the hydraulic pressure of the wheel cylinder W/C(2) is increased. When the hydraulic pressure on the left end of the balance piston 128 comes to surpass the hydraulic pressure on the right end thereof, the balance piston 128 moves to the right. This causes the valve body part 132 of the poppet valve 129 again to come onto the valve seat 131. With such actions are repeated, the rear wheel cylinders of the first and second channels come to have their hydraulic pressure increased to the same degree through the action of the balance piston 128.

Under a maximum load condition, the flow passage 123 is open before the deceleration detecting valve closes, and the hydraulic pressure of each rear wheel cylinder increases to the same degree as the master cylinder.

In the same way as under the empty condition of the vehicle, the balance piston 128 in this case also serves to increase the hydraulic pressures of the wheel cylinders of the first and second channels to the same degree.

Under a half load condition (or a light load condition), the first channel shows a hydraulic pressure increasing characteristic similar to that of the previous embodiment example while the rear wheel cylinder of the second channel also has the same hydraulic pressure increasing characteristic through the action of the balance piston.

Next, when a pressure source of either one of the first and second channels fails, the embodiment operates in the following manner:

(1) When the pressure source of the first channel fails:
Assuming that the sectional area of the balance piston 128 is A1, the sectional area of the annular middle part of the cylinder member 126 is A2, the pushing force of the spring 115 is F3 and the pushing force of the spring 119 is F4, the embodiment is arranged so that:

$$F3/A1 > F4/F3$$

Therefore, when the hydraulic pressure of the second channel increases, the piston 114, the valve member 116, the cylinder member 126 and the balance piston 128 simultaneously move to the right until the right end of the piston 114 comes into contact with the bottom of the cylinder 113. As a result of this, the valve body part 132 of the poppet valve 129 always remains away from the valve seat 131. Therefore, the exit pressure of the second channel always increase to the same degree as its entrance pressure to compensate for the insufficiency of the braking force of the first channel.

(2) When the pressure source of the second channel fails:

The balance piston 128 does not work. However, in the same manner as in the case of the maximum load condition, the flow passage 123 is opened by the rightward movement of the piston 114. After that, the deceleration of the vehicle reaches the preset value g and the ball 109 comes onto the valve seat 111. Therefore, hydraulic brake pressure coming from the input port 104 is transmitted to the output port 107 through the flow passage 105, valve chamber 103 and the flow passage 108 in the initial stage and later through the flow passage 123.

Accordingly, the exit pressure of the first channel increases to the same degree as the entrance pressure to compensate for the insufficiency of the braking force caused by the failure of the pressure source in the second channel.

In the deceleration detecting type proportioning valve of the present invention, as described in the foregoing, the operations of the deceleration detecting valve and the proportioning valve arranged in combination in the flow passage connecting the master cylinder to each rear wheel cylinder are controlled in a relationship such that the hydraulic brake pressure required for obtaining a preset degree of deceleration varies with the live load on the vehicle. Under an empty or light load condition of the vehicle, the hydraulic pressure of the rear wheel cylinder is lessened so as to be lower than that of the master cylinder to prevent locking of each rear wheel. In the case of a maximum load or overload condition, the hydraulic pressure of the rear wheel cylinder is increased to the same degree as in the front wheel cylinders so that insufficiency in the braking force on the rear wheels can be prevented. Compared with the conventional proportioning valves, the valve of the present invention is of a simple construction and yet is capable of shortening braking distance of the vehicle in response to variation in the load condition thereof. The invention is, therefore, highly advantageous for practical applications.

What is claimed is:

1. A deceleration detecting type proportioning valve for a vehicle comprising:
   a cylinder body;
   a differential area piston slidable within said cylinder body;
   input and output chambers provided within said cylinder body;
   a first spring which presses said piston toward said exit chamber;
   a valve seat disposed inside said cylinder body;
   a valve member which is caused to engage said valve seat by a pushing force of a second spring;
   a first flow passage allowing said input and output chambers to communicate with each other;
   a valve head which shuts off the communication between said input and output chambers through said first flow passage;
   a second flow passage which allows said input and output chambers to communicate with each other when said valve member is caused to move away from said valve seat by a predetermined amount of the movement of said piston toward said input chamber to a preset extent or further;
   a third flow passage allowing said input chamber to communicate with said output chamber; and
   a deceleration detecting valve which is disposed in said third flow passage and closes when deceleration of the vehicle reaches a preset value.

2. A proportioning valve for a vehicle according to claim 1, wherein said valve member is provided with an approximately cylindrical seal holder and an elastic seal carried by said seal holder.

3. A proportioning valve for a vehicle according to claim 2, wherein said seal holder and said piston are respectively provided with engaging devices, which the movement of said piston toward said input chamber brings into engagement with each other thereby to move said seal away from said valve seat.

4. A proportioning valve for a vehicle according to claim 2, wherein said second flow passage is provided on the outer circumference of said seal holder.

5. A deceleration detecting type proportioning valve for a vehicle comprising:
   a cylinder body;
   a large diameter cylinder and a small diameter cylinder provided within said cylinder body respectively;
   a differential area piston which is slidable within said small diameter cylinder;
   a cylinder member slidable within said large diameter cylinder;
   a balance piston slidable within a cylinder provided in the middle part of said cylinder member;
   a first output chamber and a second output chamber respectively provided on both sides of said balance piston;
   a first input chamber and a second input chamber respectively provided at both ends of said large diameter cylinder;
   a first spring which pushes said differential area piston toward said first output chamber;
   a valve seat disposed at one end of said cylinder member;
   a valve member which is caused by a pushing force of a second spring to engage said valve seat;
   a first flow passage allowing said first entrance chamber to communicate with said first output chamber;
   a valve head which is disposed at said differential area piston and is arranged to come into engagement with said valve member to shut off the communication allowed by said first flow passage between said first input chamber and said first output chamber;
   a second flow passage which allows said first input chamber to communicate with said first output chamber when said valve member is caused to move away from said valve seat by a predetermined amount of the movement of said differential area piston toward said first input chamber;
   a third flow passage which allows said first input chamber to communicate with said first output chamber;
   a deceleration detecting valve which is disposed in said third flow passage and closes when the deceleration of the vehicle reaches a preset value; and
   a shut-off valve which shuts off communication between said second input chamber and said second output chamber in response to the movement of said balance piston toward said first output chamber.

6. A proportioning valve according to claim 5, wherein said valve member is provided with an approximately cylindrical seal holder and an elastic seal carried by said seal holder.

7. A proportioning valve according to claim 6, wherein said seal holder and said piston are respectively provided with engaging devices, which the movement of said piston toward said first input chamber brings into engagement with each other thereby to move said seal away from said valve seat.

8. A proportioning valve according to claim 6, wherein said second flow passage is provided on the outer circumference of said seal holder.

9. A proportioning valve according to claim 5, wherein said shut-off valve is provided with a valve seat disposed at the other end of said cylinder member and a poppet valve which is pushed by a pushing force of a third spring toward said valve seat and is in contact with said balance piston.

* * * * *